US007097241B2

(12) United States Patent
Tally et al.

(10) Patent No.: US 7,097,241 B2
(45) Date of Patent: Aug. 29, 2006

(54) MECHANIC'S SEAT AND STEP STOOL

(75) Inventors: Kevin L. Tally, Clarinda, IA (US); John C. Lisle, Clarinda, IA (US); William Meis, Crescent, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 10/921,507

(22) Filed: Aug. 19, 2004

(65) Prior Publication Data

US 2005/0040680 A1 Feb. 24, 2005

Related U.S. Application Data

(63) Continuation-in-part of application No. 10/444,228, filed on May 23, 2003, now abandoned.

(60) Provisional application No. 60/383,206, filed on May 24, 2002.

(51) Int. Cl.
*A47C 13/00* (2006.01)
*B60B 33/00* (2006.01)

(52) U.S. Cl. .............................. 297/118; 297/1; 297/3; 297/423.41; 16/43

(58) Field of Classification Search .................... 297/1, 297/2, 3, 118, 423.41, 461; 108/33; D6/349, D6/350; 16/43, 42 T, 38; 248/346.11
See application file for complete search history.

(56) References Cited

U.S. PATENT DOCUMENTS

| | | | | | |
|---|---|---|---|---|---|
| 1,427,583 | A | * | 8/1922 | Davis | 182/129 |
| 1,668,379 | A | * | 5/1928 | Radvanyi | 280/32.6 |
| 2,134,444 | A | * | 10/1938 | Harsh | 16/19 |
| 2,592,912 | A | * | 4/1952 | Knipper | 182/33 |
| 3,128,495 | A | * | 4/1964 | Tooth | 16/43 |
| 3,556,586 | A | * | 1/1971 | Beardmore | 297/3 |
| 3,599,750 | A | * | 8/1971 | Serwer | 182/15 |
| 4,537,282 | A | * | 8/1985 | Lobdell | 182/46 |
| D281,119 | S | * | 10/1985 | Kalkus | D7/605 |
| 4,580,799 | A | * | 4/1986 | Quinonez | 280/32.6 |
| 4,968,091 | A | * | 11/1990 | Mariol | 297/3 |
| 5,094,505 | A | * | 3/1992 | Nichols | 297/118 |
| 5,186,479 | A | * | 2/1993 | Flowers | 280/47.35 |
| D362,125 | S | * | 9/1995 | Crust | D6/349 |
| 5,707,067 | A | * | 1/1998 | Smith | 280/32.6 |

* cited by examiner

*Primary Examiner*—Peter M. Cuomo
*Assistant Examiner*—Joseph Edell
(74) *Attorney, Agent, or Firm*—Banner & Witcoff

(57) ABSTRACT

A combination step stool and mechanic's seat in the form of a molded plastic, generally parallelepiped configuration includes a seat on one side supported on casters on the opposite side with a step stool surface adjacent the backside of the seat and spaced from a front side surface of the seat which includes a recess tray for tools and other items.

14 Claims, 7 Drawing Sheets

MECHANIC'S SEAT AND STEP STOOL

CROSS REFERENCE TO RELATED APPLICATION

This is a continuation-in-part application of Ser. No. 10/444,228 filed May 23, 2003 now abandoned, entitled Mechanic's Seat and Step Stool which was a utility application based upon and derived from prior provisional application Ser. No. 60/383,206 filed May 24, 2002 for "Mechanic's Seat and Step Stool" which provisional application is incorporated herewith by reference and for which priority is claimed, and which parent utility application is incorporated by reference and for which priority is claimed.

BACKGROUND OF THE INVENTION

In a principal aspect, the present invention relates to a molded work seat which may also be utilized as a low-rise step stool.

When a worker, such as a mechanic, tradesman, or the like is required to assume a seated position in order to perform repair work, the use of a chair may not be convenient or adequate. That is, a typical chair, for example, a folding chair, may have a seat which is elevated relative to the work area. Additionally, such a chair is difficult to move from one place to another. Finally, such a chair typically will not include a means for storage of tools for easy access while using the chair or seat.

An alternative to a chair is a stool such as a three-legged stool which can be moved from place to place. A stool will typically have many of the disadvantages associated with a chair including the further disadvantage that there is no lateral or back support when sitting on a stool.

Another alternative is to utilize a creeper seat. Such a seat typically includes a metal frame mounted on a platform which, in turn, is mounted on rollers. The seat is supported by the metal frame. The rollers enable ease of movement of the creeper seat. The platform upon which the frame is mounted allows storage of tools thereon for ease of access. Lisle Corporation, Clarinda, Iowa, has marketed such seats as their Product Nos. 98302 and 98702.

Such chairs, seats and stools are either cumbersome or have other disadvantages as discussed above. Thus, there has remained a need for an improved seat construction which can be used by a mechanic or other work person and which desirably has alternative utility.

BRIEF DESCRIPTION OF THE INVENTION

Briefly, the present invention comprises a molded polymeric, step stool and seat which is in the form of a six-sided, rectangular parallelepiped and includes a first wall having casters and a second opposite side wall with a molded work seat. A third transverse sidewall connecting the top edge of the first and second walls defines a flat planar step surface. A fourth transverse wall is generally parallel to and spaced from the third wall and connects the lower edge of the first and second walls defines a floor support surface including optional floor support pads to prevent skidding of the device when it serves as a step stool. The fourth wall may also include a recess shelf for storage of tools and implements. In an additional embodiment, the first wall may include a molded step below the level of the third wall to facilitate stepping to the third wall step surface.

Thus, it is an object of the invention to provide a combination step stool and creeper seat.

It is a further object of the present invention to provide a molded polymeric combination step stool and creeper seat which is lightweight, economical, and rugged.

Yet another object of the invention is to provide a combination mechanic's step stool and creeper seat which includes a shelf for storage of tools and implements when the device is oriented or positioned as a mechanic's seat.

Yet another object of the invention is to provide a mechanic's creeper seat which may be mounted on casters for ease of mobility.

These and other objects, advantages and features of the invention will be set forth in the detailed description which follows.

BRIEF DESCRIPTION OF THE DRAWING

In the detailed description which follows, the drawing is comprised of the following figures.

DESCRIPTION OF THE PREFERRED EMBODIMENT

Figure 1:
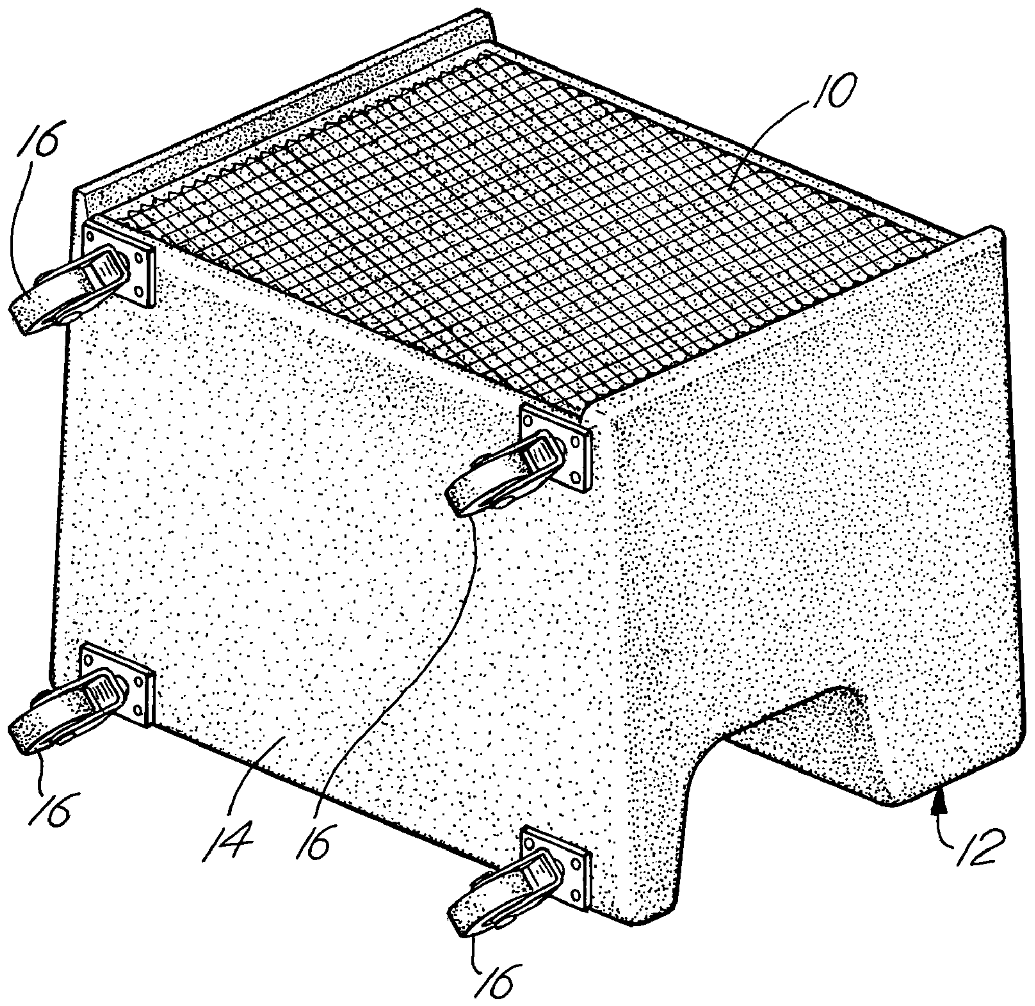
FIG. 1 is an isometric view of a first embodiment.

FIG. 1 illustrates a combination mechanic's seat or stool and step stool. The combination is preferably manufactured from a plastic material such as polypropylene formed by a rotational mold process, injection molding, or other molding process. The overall general configuration is that of a parallelepiped, in particular, a rectangular parallelepiped. The molded device may have inclined sides formed with draft angles to facilitate the molding process as well as to improve the aesthetics, balance and utility of the product.

Figure 2:
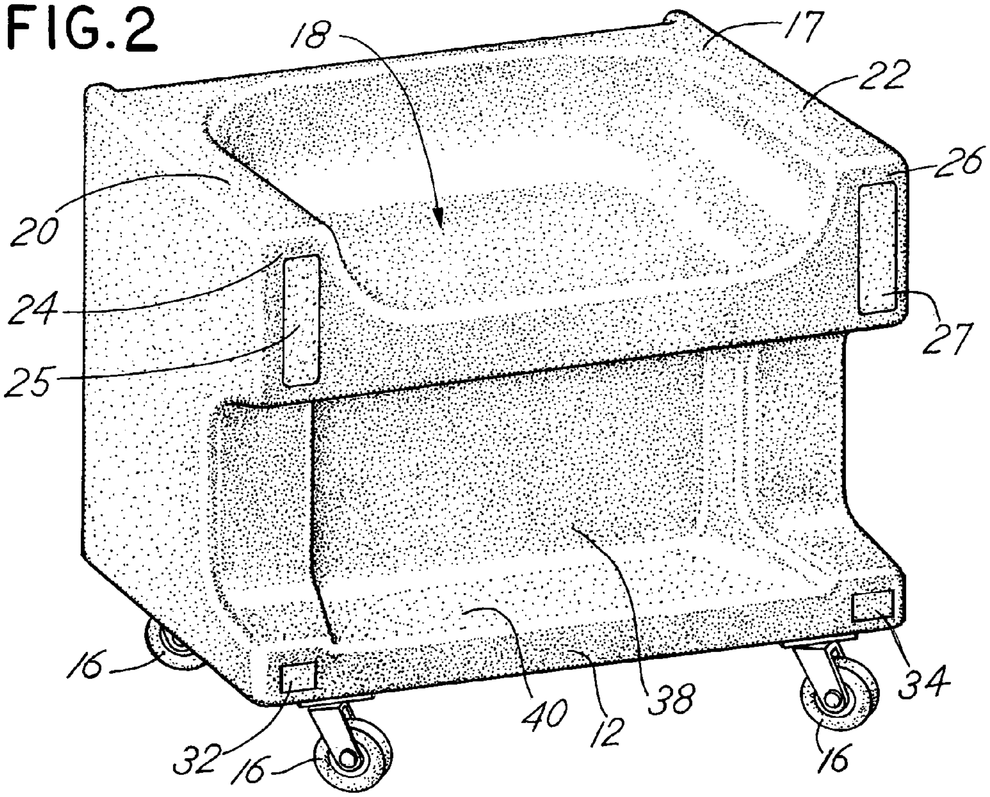
FIG. 2 is an alternative isometric view of the embodiment of FIG. 1.

Referring to FIG. 1, the device is depicted to function as a step stool. FIG. 2 illustrates the device oriented to function as a creeper or mechanic's seat mounted on rollers or casters. When the item is utilized as a step stool, as in FIG. 1, a top face 10 includes a serrated or patterned surface to prevent slippage. A non-skid pad (not shown) may also be affixed to surface 10. Thus, top surface 10 is a generally flat, planar surface generally parallel to and spaced from a bottom or lower surface 12.

A first side surface 14 includes a series of casters or wheels 16 arranged at the four corners of the first side face or side surface 14. As shown in FIG. 2, the side opposite the first side surface 14 comprises a second side surface 17 with a recessed seat 18 molded or formed therein. The recessed seat 18 includes parallel, spaced side ribs 20 and 22 which reinforce the unit. A back support 19 is molded between ribs 20, 22. End surfaces 24 and 26 on the second or bottom surface 12 includes non-skid pads 25, 27, 32, 34. The pads 25, 27, 32, 34 prevent slippage of the device when used as a step stool as depicted in FIG. 1.

Bottom or third side surface 12 is generally parallel to top surface 10 and also includes a first corner support pad 32 and a second corner support pad 34 so that the surface 12 includes four comer pads 25, 27, 32, 34 which facilitate support of the stool as depicted in FIG. 1 as a step stool.

As depicted in FIG. 1 when the combination seat and stool is oriented so that the pads 25, 27, 32 and 34 are positioned on the floor, the support surface 10 is elevated above the floor. A person may thus step upon the support surface 10 and thereby utilize the device as a step stool.

The surface 12 also includes a recessed section 38 beneath the seat 18. The recessed section 38 includes a generally flat shelf 40 for placement of tools and other items to be used by the mechanic who is sitting in the seat 18 and wishes to reach between his/her legs to have access to a tool. As shown in FIG. 2, when sitting on the seat 18, a mechanic may easily move by virtue of the casters 16 engaging a floor surface.

Figure 3:
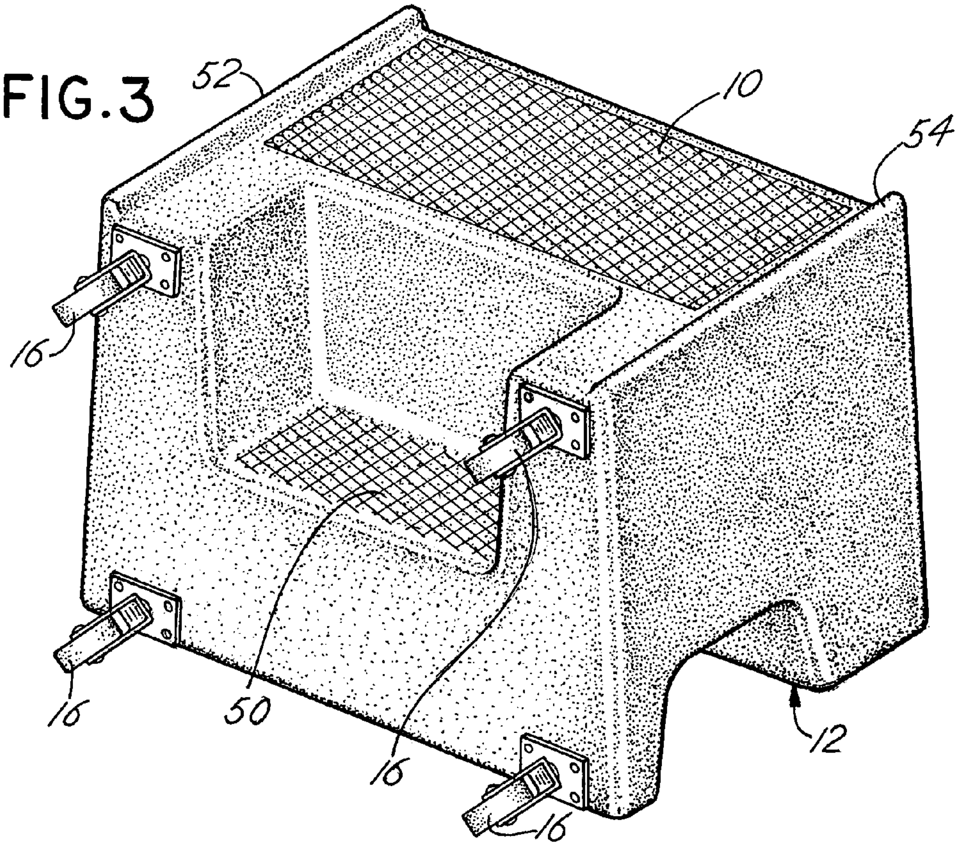
FIG. 3 is an isometric view of an alternative embodiment having an intermediate step for the step stool feature of the device.
Figure 4:
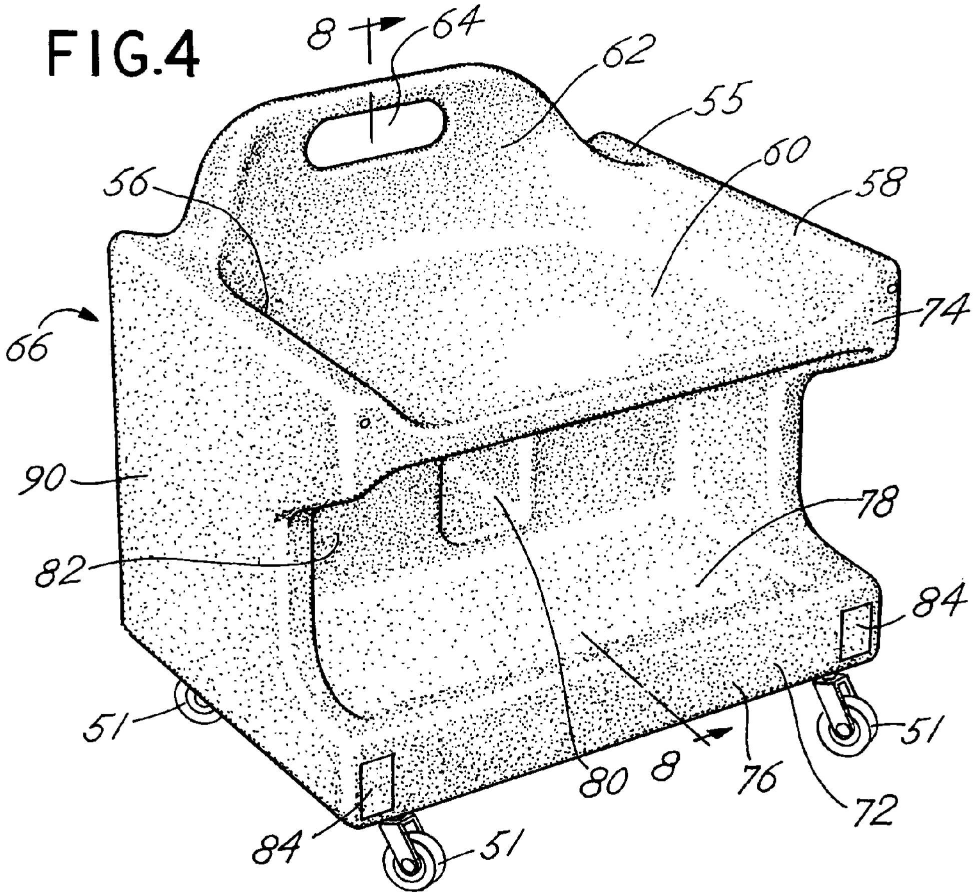
FIG. 4 is an isometric view of another alternative embodiment of the combination seat and step stool wherein the device is oriented for use as a seat.
Figure 5:
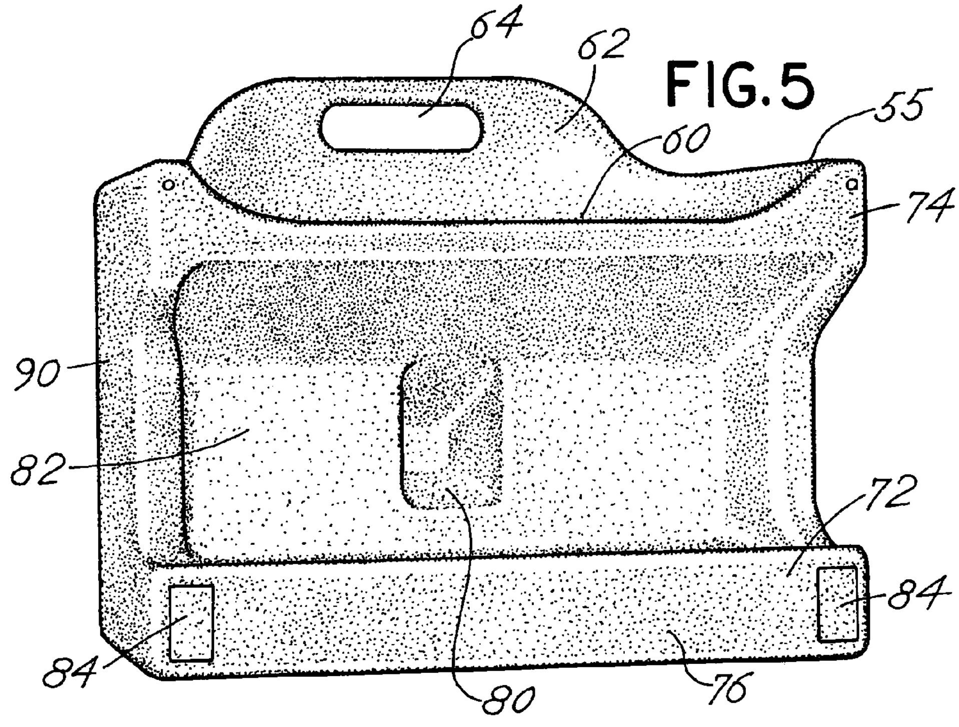
FIG. 5 is an isometric view of the seat configuration of FIG. 4 as viewed from the front side or forward side of the seat illustrating in detail the recess shelf for tools and implements.
Figure 6:
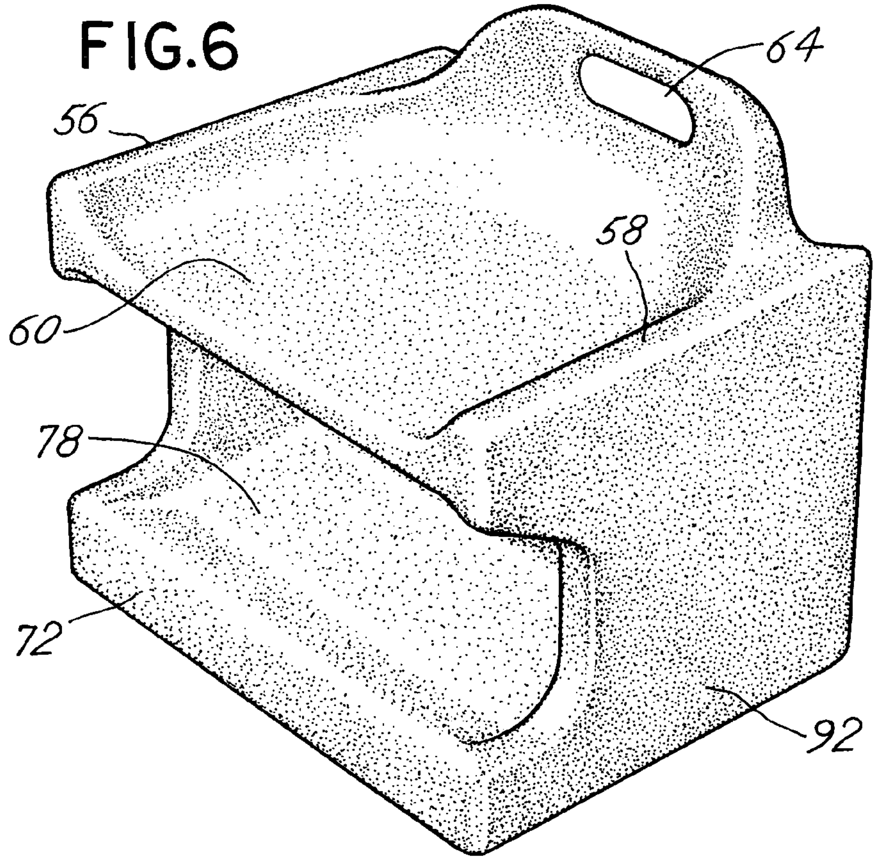
FIG. 6 is an isometric view of the seat configuration of FIG. 4 as viewed from the opposite side of the seat depicted in FIG. 4.

FIG. 3 illustrates an alternative embodiment wherein the stool is positioned as a step stool and a middle step 50 is formed in the side surface 14. The middle step 50 thus is positioned between two casters 16 and enables the user to ascend to the top surface 10 more easily. The top surface 10 is subscribed by side or parallel ribs or ridges 52 and 54 which provide the user of the step stool an indication that they are approaching the side edges of the stool. It is also possible to include such a rib or ridge along the other surfaces or edges of the step stool.

Figure 7:
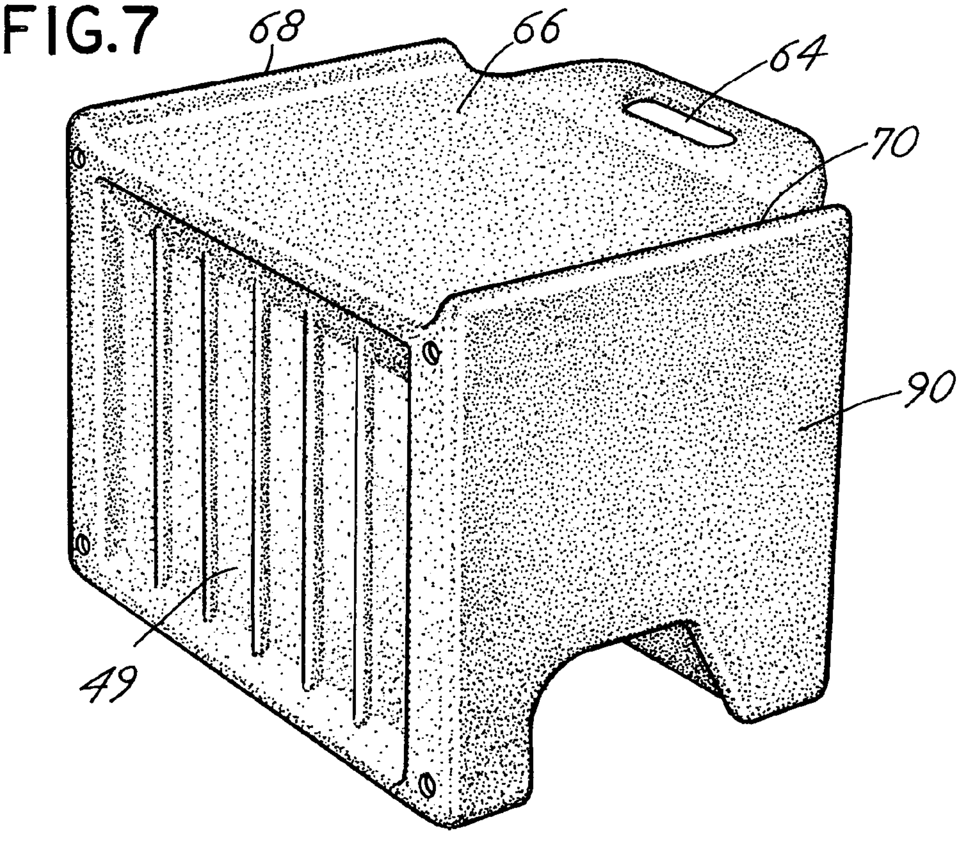
FIG. 7 is an isometric view of the device of FIG. 4 wherein the device has been positioned so as to serve as a step stool.
Figure 8:
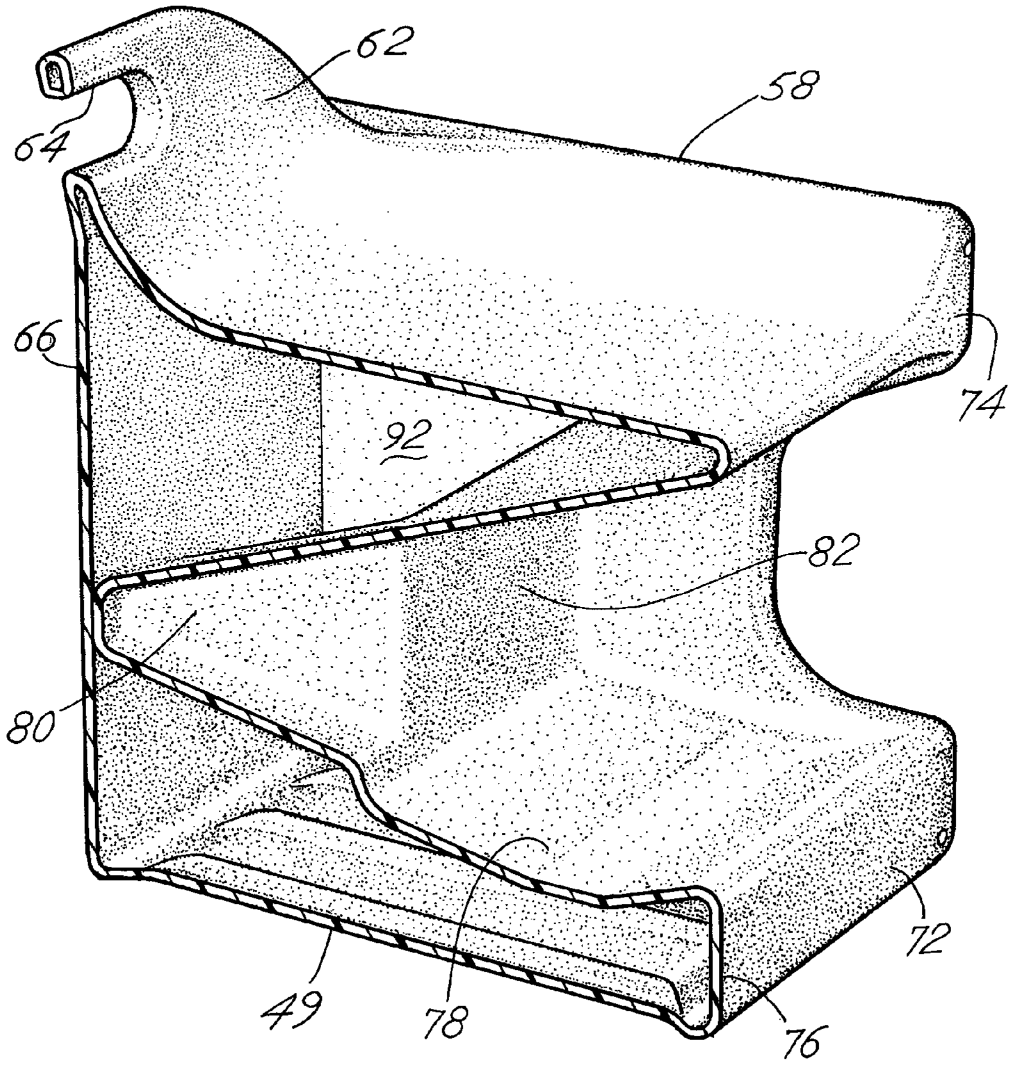
FIG. 8 is a cross sectional view of the device of FIG. 4 taken substantially along the line 8—8.

FIGS. 4–8 illustrate another alternative embodiment of the invention. A first or lower or bottom wall 49 is constructed to receive casters 51 positioned at the four corners of the bottom wall 49. A second opposite sidewall 54 includes lateral molded arm supports 56 and 58 with an intermediate connecting seat 60 and a back support section 62. The back support section includes a hand hold opening 64 to facilitate carrying or movement of the device. A third wall 66 connects the bottom wall 49 and the top wall 55 and provides a step surface 66 as shown in FIG. 7. The step surface 66 includes lateral ribs 68 and 70 which define the opposite sides of the step surface 66 to indicate side margins to a user of the step surface. A fourth wall 72 is bifurcated into an upper wall section 74 and a lower wall section 76. The upper wall section 74 defines the outer margin of the seat 60. A recess tray 78 is formed in the wall 72 between the sections 74 and 76. A recess bore 80 is defined in the back wall 82 of the tray 78 to enhance structural integrity of the seat and step stool construction. Non-skid pads, such as pad 84, may be installed at the corners of the surface 72 so that when the step stool is in the configuration illustrated in FIG. 7, that it will be precluded from skidding undesirably. Opposite end surfaces 90 and 92 of the generally parallelepiped structure form the outer margins and connecting panels which join the other described surfaces of the generally parallelepiped structure comprising the seat and step stool.

Figure 14:
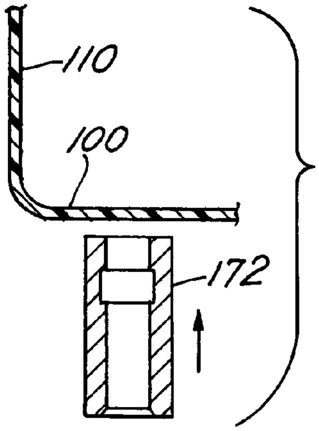
FIG. 14 is a cross sectional view of an alternate method of attaching a caster to a corner of an injection or blow molded product which alternate method is deemed to be generally undesirable.
Figure 15:
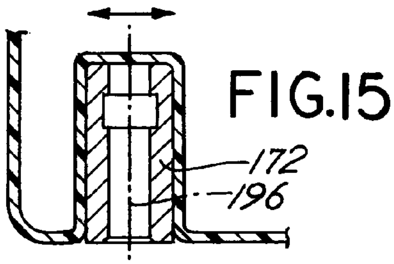
FIG. 15 is a cross sectional view of the embodiment of FIG. 14 further illustrating the method.

FIGS. 9–13 illustrate an alternative embodiment of the invention. FIGS. 14 and 15 are provided for purposes of comparison with the method of manufacture of the stool assembly of FIGS. 9–13. That is, the embodiment of FIGS. 9–13 is a preferred embodiment. FIGS. 14 and 15 illustrate an embodiment of a caster construction for a stool which is not preferred.

Figure 9:
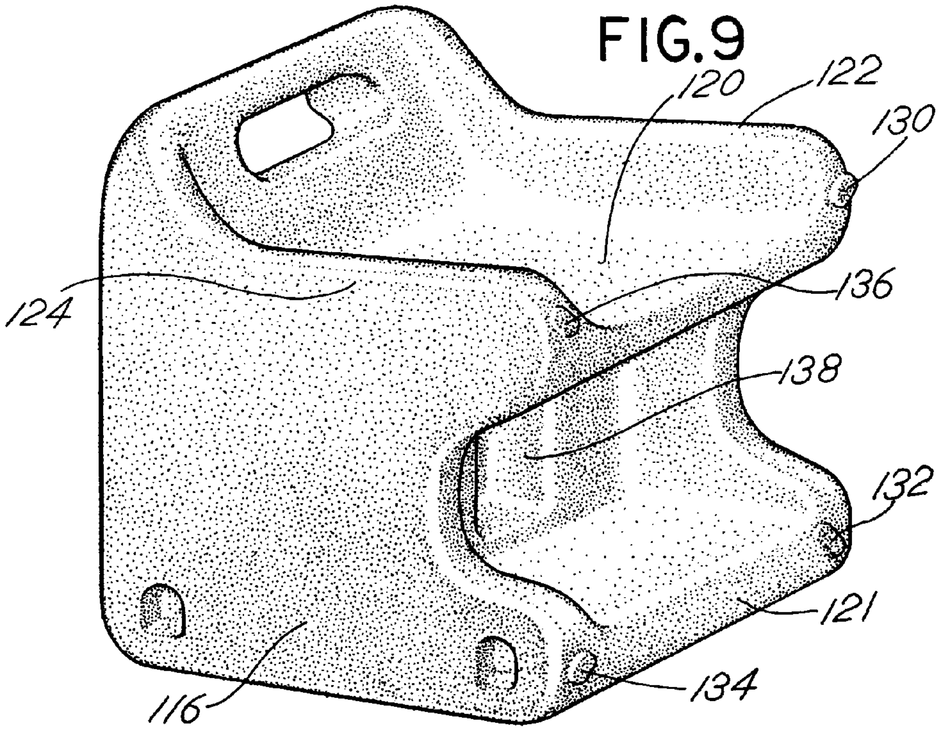
FIG. 9 is an isometric view illustrating another alternative embodiment of the invention.
Figure 10:
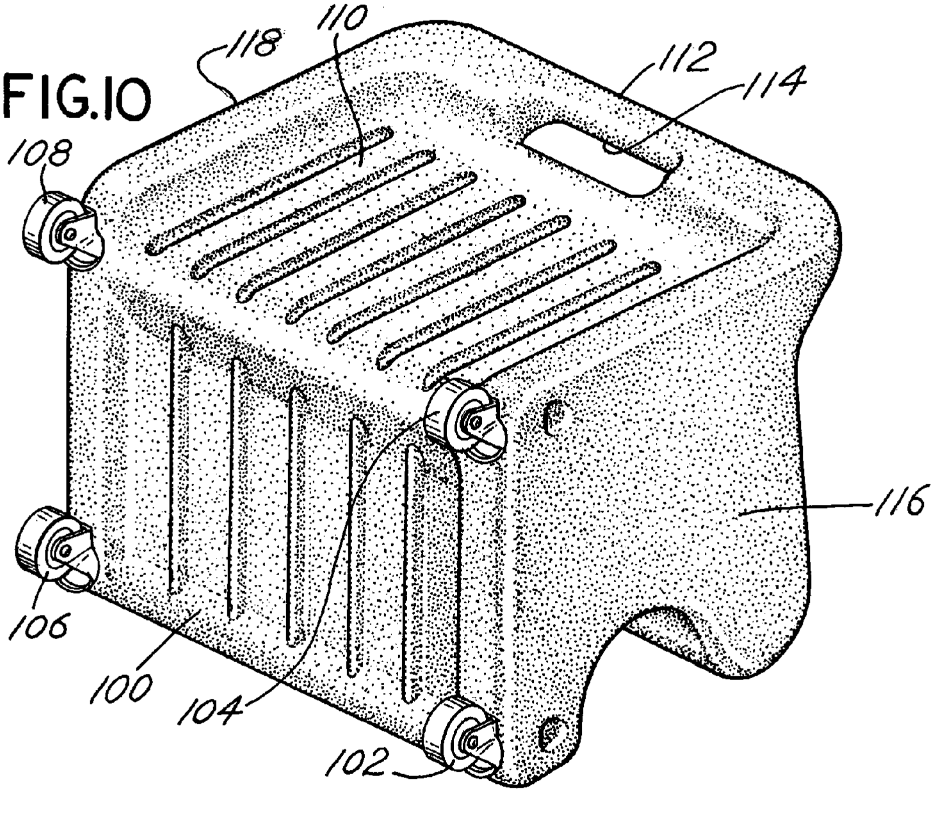
FIG. 10 is an isometric view of the underside of the alternative embodiment of FIG. 9.
Figure 11:
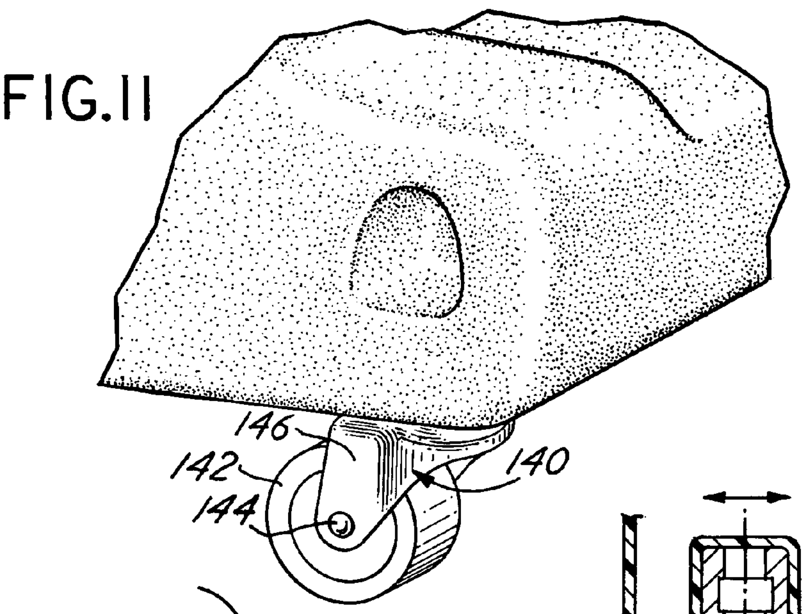
FIG. 11 is an enlarged isometric view of a caster attached to the embodiment of FIG. 9.

Referring therefore to FIGS. 9 and 10, the step stool construction has the same general configuration as associated with the prior embodiments. Thus, a base 100 is generally in the form of a rectangular planar member. Casters 102, 104 106 and 108 are affixed to the base 100 at the respective corners thereof. A lateral side 110 extends generally vertically upward from the base 100 and terminates with an upper cross member 112 including a handhold 114 therein. A first generally vertical side panel 116 is in opposed, spaced relation to a second opposite side panel 118. A top side 120 opposite the base 100 comprises a seat with side supports 122 and 124. The front side 121 of the step stool opposite the rear or backside 110 is comprised of four support projections 130, 132, 134 and 136. A pocket 138 is formed in the front side wall 121. The embodiment of FIGS. 9 and 10 is therefore substantially similar to that depicted in FIGS. 4 and 5, for example.

A caster assembly 140 is provided at each of the four corners of the base 100. Caster assembly 140 includes a wheel 142 mounted on an axle 144 retained in a wheel housing 146 which is attached to a stem 148 in FIG. 13. The stem 148 is rotatably connected to the wheel housing 144 by means of an appropriate raceway 150. Retention spring 152 is retained in a recessed groove 154 defined in the stem 148 enabling the stem 148 to be engaged with and locked into a bushing retained in the molded plastic housing comprising the step stool. Each of the casters 140 thus are rotatably mounted on a stem 148 and positioned appropriately in bushings molded into or retained at the four comers of the stool.

Figure 13:
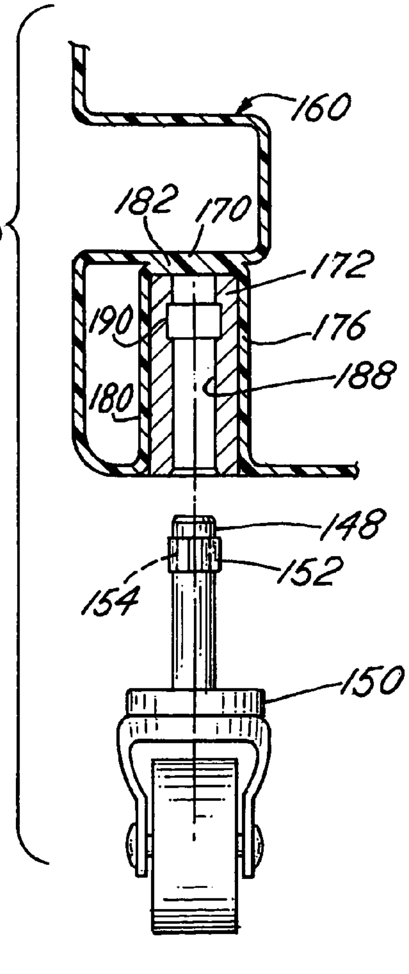
FIG. 13 is a cross sectional view of a subsequent sequential step to the step depicted in FIG. 12 in the formation of the corner adapted for receipt of a caster for the embodiment of FIG. 9.
Figure 12:
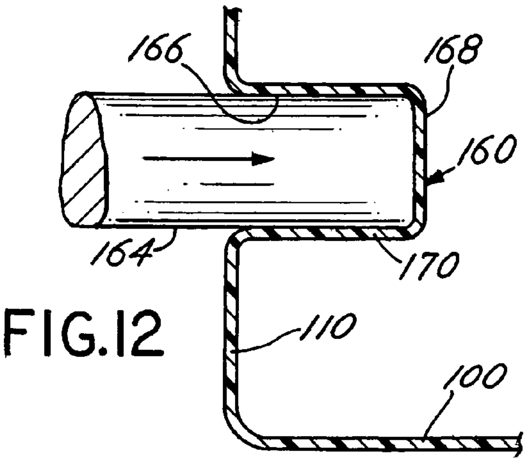
FIG. 12 is a cross sectional view depicting a step in construction of the caster attachment feature during the manufacturing process for the embodiment of FIG. 9.

As previously indicated, a preferred method of manufacture of such a molded plastic stool is by blow molding techniques. However, other molding techniques may be utilized in order to manufacture the stool. Thus, the stool is comprised of a molded plastic material, such as HDPE defined by a wall such as the wall 160 in FIGS. 12 and 13. In FIGS. 12 and 13 the wall 160 is a continuous molded plastic wall including a base wall 100 and a vertical back side wall 110. During the molding process, a shaft 164 is engaged with the wall 110 after the molded product is initially formed but while the walls are still pliable to define a recessed counterbore 166 having an end wall 168 and a lateral side wall 170 as depicted in FIG. 12. Subsequently, a bushing 172 which is mounted on a pin associated with the blow molding equipment or rotational molding equipment is inserted through the pliable bottom or lower wall 100 so that the bushing 172 will be entirely retained within a counterbore 176. The counterbore 176 includes a peripheral wall 180 which surrounds and locks to the bushing 172. Further, there is included an upper or top connecting wall 182 which fuses with the wall 170 depicted in FIG. 12. Fusing of the walls 182 and 170 lends significant structural support to the bushing 172 and thus when a caster 148 is inserted into the bushing 172 the wheel assembly is well supported and will not fail. Note the bushing 172 includes a hollow passage 188 adapted to receive the stem 148. Further included is a groove 190 adapted to receive and lock the stem 140 due to the engagement of the spring member 152 with the groove 190. In this manner as depicted in the figures, each caster assembly is attached in a manner which provides sufficient structural integrity needed to support the weight of a person, for example on the step stool.

FIGS. 14 and 15 illustrate an alternative method of insertion of a bushing 172 in a molded plastic wall. After the bottom wall 100 and the back wall 110 are formed, bushing 172 is projected into the wall 100 as depicted in FIG. 14. The resulting configuration depicted in FIG. 15 does not have the structural integrity, however, needed to maintain the wheel housing properly in the position represented by the axis 196. The embodiment of FIGS. 12 and 13, however, accomplishes the desired result of maintaining the wheel including the bushing 172 and the wheel assembly 140 in a desired orientation and position.

The construction of the invention is especially useful in combination with, or incorporated with, a blow molded or another thin wall or relatively thin wall molded plastic product. When manufacturing such a product using blow molding techniques, the plastic material which is utilized in the process will initially be adequately soft to permit the insertion of shafts and bushings as described above. It should be noted that the configuration or cross sectional shape of the shaft is not a limiting feature of the invention. Likewise, bushings of various size, shape and cross sectional configuration may be utilized in the practice of the invention. Important features associated with the invention include the concept of supporting the bushing and more particularly support for the molded material which forms the cavity for the bushing so as to have improved structural rigidity and capacity.

The construction lends itself to molding and subsequent attachment of casters. Further, the device provides utility as a step stool as described and also as a creeper seat or movable mechanics stool which is typically used for example, during vehicle repair or production lines, etc. Thus, variations from the embodiment are considered within the scope of the invention which is limited only by the following claims and equivalents thereof.

What is claimed is:

1. A combination step stool and seat comprising, :n combination:

a six sided, unitary single piece molded plastic, generally rectangular parallelepiped assembly of walls including a first side wall, an opposed second side wall with a molded seat, said seat including a back support section with a hand grip passage, a transverse third side wall between the first side wall and second side wall, said third side wall comprising a generally flat, planar step surface and said back support section, a transverse fourth side wall spaced from and generally parallel to the third side wall for support of said combination assembly as a step stool, said first side wall being positionable at the floor to define a creeper with a molded seat, said fourth side wall being positional le at the floor at an alternative orientation of said assembly to define said step stool, said fourth side wall comprising an upper wall section, a lower wall section, and a connecting recess shelf wall section between said upper wall and lower wall sections, said recess shelf wall section extending partially to the third side wall wherein the upper wall section, the lower wall section, and the recess shell wall section being continuously molded; and casters mounted on the first side wall.

2. The combination of claim 1 wherein the second side wall includes arm support sections on each side of the molded seat extending from the back support section along the edge of the seat.

3. The combination of claim 1 wherein the first side wall includes a molded step.

4. The combination of claim 1 wherein a carter comprises a bushing mounted in a molded recess in the first side wall, said molded recess comprising a bushing counterbore in a molded plastic wall with an internal counterbore top wall, said counterbore top wall fused to a molded plastic counterbore wall of an adjacent counterbore molded in a wall adjacent the first side wall to thereby reinforce the bushing counterbore, said bushing positioned to receive a stem of a wheel housing.

5. The combination of claim 4 including a plurality of bushing each retained in said bushing counterbore.

6. A molded plastic stool having a base support wall with a recessed first bushing counterbore with a counterbore base wall and a top wall, said first bushing counterbore including a bushing of a caster assembly, said stool further including a secondary, integrally molded wall extending upwardly from the base support wall separate from said counterbore base wall, said secondary molded will including an adjacent second molded counterbore with an adjacent counterbore lateral wall fused to the top wall of the first bushing counterbore to reinforce the first bushing counterbore, said bushing positioned in said first bushing counterbore to received a stem of a wheel housing.

7. The combination of claim 6 comprising a plurality of combination first bushing counterbores and second adjacent counterbores fused thereto.

8. A step stool and work seat combination comprising:

a unitary molded plastic, generally rectangular parallelepiped assembly including a first support wall;

an opposed second side wall spaced form the first support wall, said second side wall including a molded seat outside surface;

a transverse third wall extending between the first and second walls, said third wall comprising a generally flat, planar step support surface;

a transverse fourth wall spaced from and generally parallel to the third wall and extending between the first and second walls;

said first wall including a plurality of integrally molded recessed bushing counterbores, each said recessed bushing counterbore comprising a counterbore lateral wall and a top wall; and a plurality of second counterbores formed in a wall connected to said first wall, each said second counterbore including a lateral side wall fused to the top wall of each said recess bushing counterbore to provide structural support to said recessed bushing counterbore.

9. The combination of claim 8 further including a bushing for a wheel housing in each recessed bushing counterbore.

10. The combination of claim 9 including a wheel housing with a wheel joined to each bushing.

11. The combination of claim 8 including a recessed bushing counterbore at each corner of the first wail.

12. The combination of claim 8 including a recess shelf formed in the fourth wall, said fourth wall including an upper wall section and a lower wall section for support of the step stool third wall generally horizontally.

13. The combination of claim 8 further including a hand hold molded in the third wall adjacent the intersection thereof with the second wall.

14. The combination of claim 8, wherein the second wall seat includes a back section along the juncture with the third wall and first and second arm sections extending from the back section toward the fourth wall.

* * * * *